United States Patent [19]

Kikuchi et al.

[11] Patent Number: 5,625,447
[45] Date of Patent: Apr. 29, 1997

[54] SCANNING TYPE LASER RADAR SYSTEM FOR VEHICLE

[75] Inventors: Hayato Kikuchi; Mahito Ishiyama, both of Wako, Japan

[73] Assignee: Honda Giken Kogyo Kabushiki Kaisha, Tokyo, Japan

[21] Appl. No.: 401,504

[22] Filed: Mar. 10, 1995

[51] Int. Cl.$^6$ .............................. G01C 3/08; G01B 11/26; G02B 26/08; B60T 7/16

[52] U.S. Cl. ..................... 356/4.01; 180/169; 356/141.1; 359/205; 359/208; 359/221

[58] Field of Search ........................ 180/169; 356/4.01, 356/141.1; 359/205, 208, 221

[56] References Cited

U.S. PATENT DOCUMENTS 4,632,543  12/1986  Endo ................................. 356/141.1

Primary Examiner—Stephen C. Buczinski
Attorney, Agent, or Firm—Nikaido, Marmelstein, Murray & Oram LLP

[57] ABSTRACT

A scanning type laser radar system for a vehicle includes a laser beam source, a mirror for forming a beam directed forwardly by reflection of laser beam from the laser beam source, a driving device for driving the mirror for turning movement about an axis vertical to a road surface to laterally scan the beam from the mirror, and a light receiver for receiving beam reflected from an object. In the laser radar system, the reflectance of upper and lower portions of the mirror is set at a value lower than that of a vertically middle portion of the mirror, or the mirror is formed into a shape such that its upper and lower portions are inclined toward the laser beam source. Thus, it is possible to avoid the unnecessary detection of a matter other than an object to be detected to the utmost.

4 Claims, 4 Drawing Sheets

MIRROR

Reflectance

SCANNING TYPE LASER RADAR SYSTEM FOR VEHICLE

BACKGROUND OF THE INVENTION

1. Field of the Invention

The present invention relates to a scanning type laser radar system for a vehicle, including a laser beam source, and a mirror for forming a beam directed forwardly by reflection of a laser beam from said laser beam source. A driving device or driving means is provided for driving the mirror for turning movement about an axis vertical to a road surface to laterally scan the beam from said mirror, and a light receiver is provided for receiving the beam reflected from an object.

2. Description of the Prior Art

Such a system is conventionally known, for example, from Japanese Patent Application Laid-open No. 203975/84.

In the known system, as shown in FIG. 5, a beam having a vertically constant angle α and a decreased width in consideration of a vertical pitching caused by an acceleration or deceleration of the vehicle is radiated to conduct a scanning laterally through a predetermined angle to detect an object such as a preceding vehicle $V_c$ existing ahead of the subject vehicle V, thereby judging whether an actuator should be operated for avoiding the collision. In the above known system, however, the mirror has a reflectance which is constant over its entire surface and hence, the range detectable by the outgoing beam is of a substantially fan shape, as shown by a dashed line in FIG. 5. For this reason, if a foreign matter 7 or the like which is undesirable to be detected as an obstacle exists on a road surface 6 between the subject vehicle V and the preceding vehicle $V_c$, there is a possibility that beam reflected from the foreign matter 7 may be detected before detection of beam reflected from the preceding vehicle $V_c$, thereby causing a mis-operation. Further, when a bridge 8, a traffic sign or the like causing no interference with the traveling of the vehicle V exists above the preceding vehicle $V_c$, there is also a possibility that the bridge 8 or the like may be detected as an obstacle to cause a mis-operation.

SUMMARY OF THE INVENTION

Accordingly, it is an object of the present invention to provide a scanning type laser radar system for a vehicle, wherein the unnecessary detection of a matter other than an object to be detected can be avoided to the utmost.

To achieve the above object, according to an aspect and feature of the present invention, there is provided a scanning type laser radar system for a vehicle, comprising a laser beam source, on a a mirror for forming a beam directed forwardly by reflection of a laser beam from the laser beam source. A driving unit or device is provided for driving the mirror for turning movement about an axis vertical to a road surface to laterally scan the beam from the mirror. A light receiver is provided for receiving beam reflected from an object. The reflectance of upper and lower portions of the mirror is set at a value lower than that of a vertically central portion of the mirror.

With the above feature of the present invention, it is possible to decrease the amount of upper and lower portions of outgoing beam, thereby avoiding the unnecessary detection to the utmost.

According to another aspect and feature of the present invention, there is provided a scanning type laser radar system for a vehicle, comprising a laser beam source and a mirror for forming a beam directed forwardly by reflection of a laser beam from the laser beam source. A driving device is provided for driving the mirror for turning movement about an axis vertical to a road surface to laterally scan the beam from the mirror. A light receiver is provided for receiving a beam reflected from an object. The mirror is formed into a shape in which an upper or a lower portion of the mirror is inclined toward the laser beam source.

With this feature, it is also possible to decrease the amount of upper and lower portions of outgoing beam, thereby avoiding the unnecessary detection to the utmost.

The above and other objects, features and advantages of the invention will become apparent from preferred embodiments taken in conjunction with the accompanying drawings.

DESCRIPTION OF THE PREFERRED EMBODIMENTS

Figure 1:
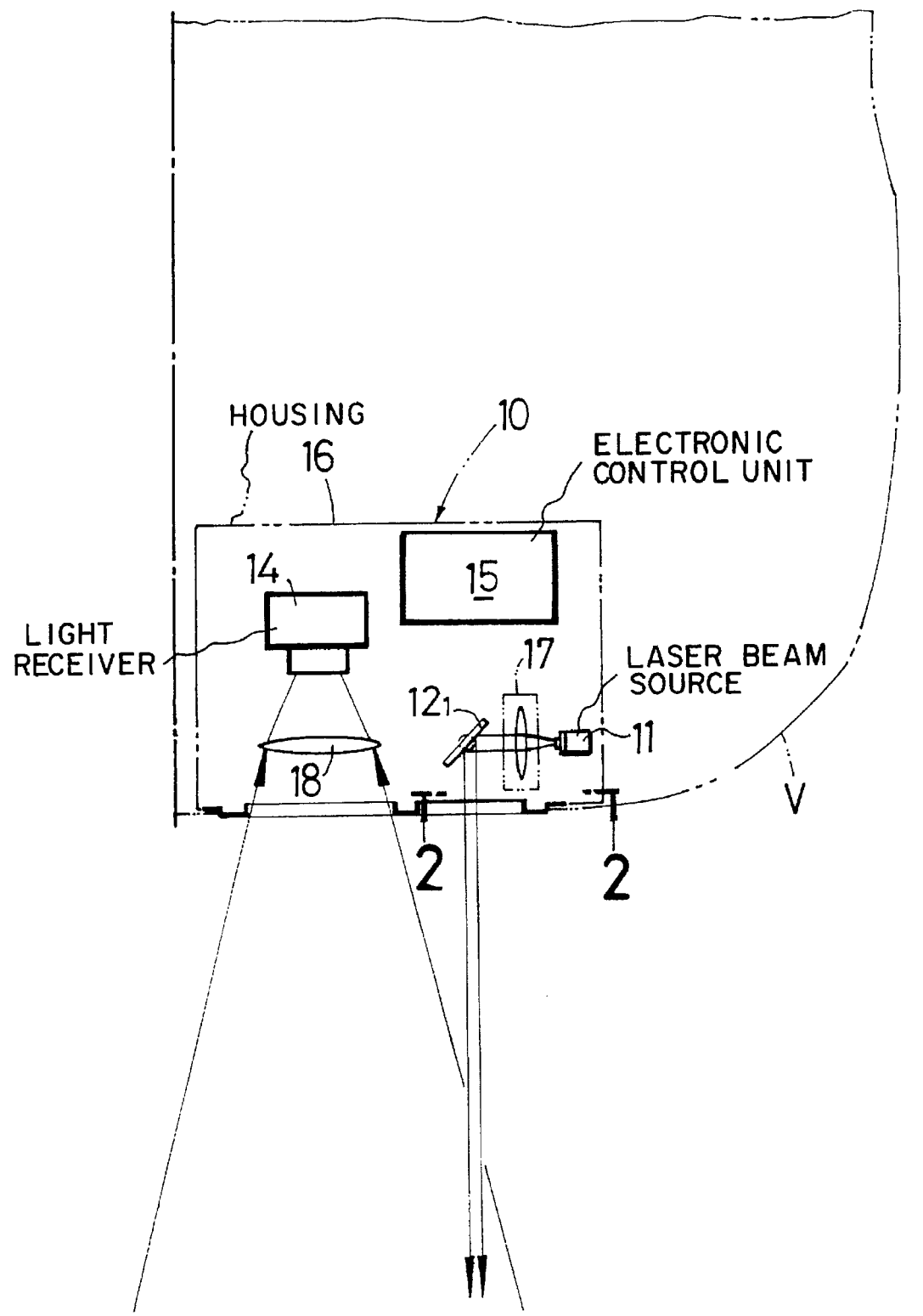
FIG. 1 is a plan view illustrating a schematic arrangement of a laser radar system according to a first embodiment of the present invention, which is mounted in a vehicle.
Figure 2:
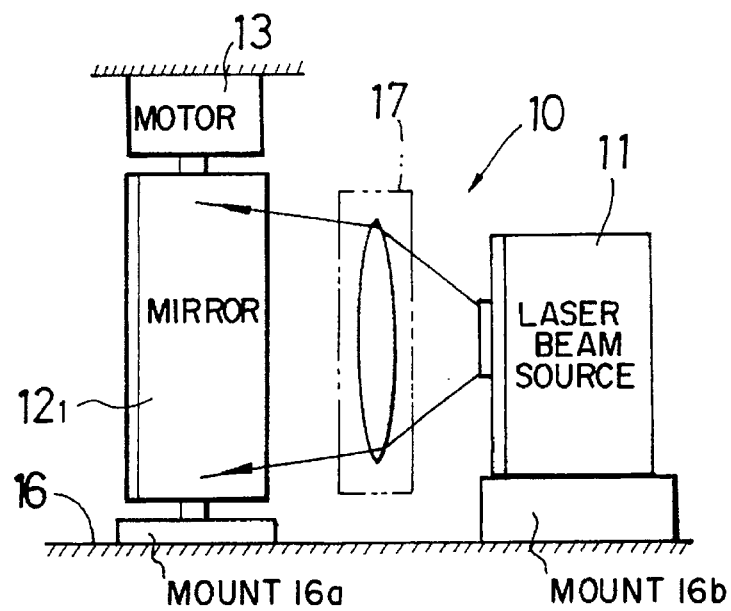
FIG. 2 is an enlarged view taken along a line 2—2 in FIG. 1.

Referring first to FIGS. 1 and 2, a laser radar system 10 according to the present invention is mounted at a front portion of a vehicle V. The laser radar system 10 includes a laser beam source 11 having a laser diode provided therein for irradiating a laser beam, a mirror $12_1$ for forming a beam directed forwardly by the reflection of the laser beam from the laser beam source 11, a motor 13 serving as a driving device or means for driving the mirror 12 for rotation about an axis vertical to a road surface to laterally scan the outgoing beam from the mirror $12_1$, a light receiver 14 having a photo-diode provided therein for receiving the reflected beam from an object, and an electronic control unit 15 for controlling the radiation of the laser beam from the laser beam source 11 and the operation of the motor 13 and calculating a distance between the vehicle V and the object or the like in response to the reception of the beam by the light receiver 14. The laser radar system 10 is accommodated in a housing 16 via mounts 16a and 16b, and mounted in the vehicle V.

Figure 3:
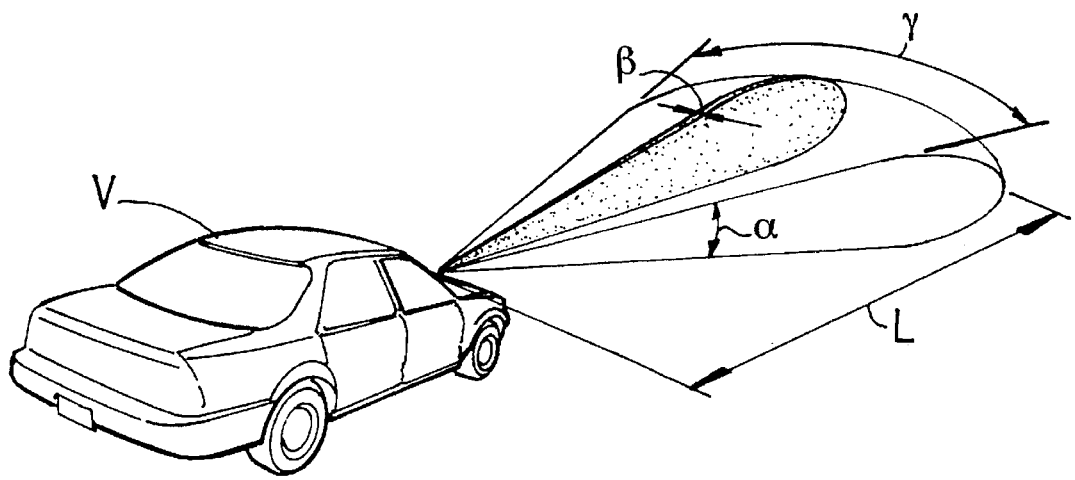
FIG. 3 is a perspective view of outgoing beam projected from a vehicle.

The mirror $12_1$ is a plane mirror standing vertical to the road surface 6 (see FIG. 5) and is rotatably supported at its widthwise central portion on a housing 16 for turning movement about the rotational axis vertical to the road surface 6 and driven in rotation by the motor 13 mounted to the housing 16. The laser beam from the laser beam source 11 is transmitted through a lens arrangement 17 comprising a plurality of lenses in combination and is then applied to the mirror $12_1$, and the laser beam reflected from the mirror $12_1$ is projected as outgoing beam forwardly of the vehicle V. The beam reflected from an object existing ahead of the vehicle V is received by the light receiver 14 through a lens arrangement 18. In this case, the laser beam source 11, the lens arrangement 17 and the mirror $12_1$ are arranged such that a widthwise spread angle of the beam is at a constant small angle $\beta$, e.g., 0.1 degrees, and the vertical spread angle of the beam is at a constant angle $\alpha$, e.g., 6 degrees vertically in total (3 degrees in each of the upward and downward directions), as shown in FIG. 3, in consideration of a vertical pitching caused by an acceleration or deceleration of the vehicle. Further, the motor 13 is arranged to drive the mirror $12_1$ for turning movement such that the scanning angle $\gamma$ is at 10 degrees in each of the leftward and rightward directions, i.e., or 20 degrees in total. The intensity of the laser beam emitted from the laser beam source 11 is set, such that the detectable maximum distance L is 100 m, for example.

Figure 4:
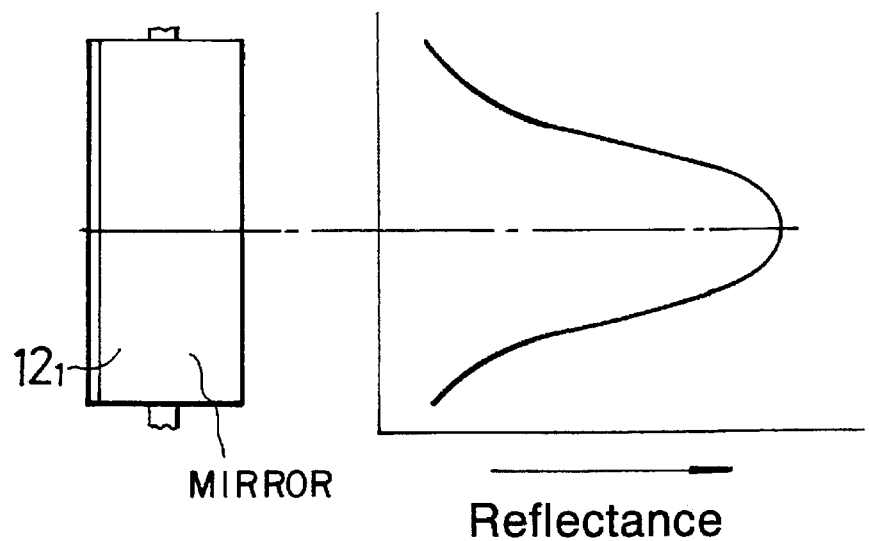
FIG. 4 is a diagram illustrating the reflectance of a mirror at vertical locations.

The reflectance of the mirror $12_1$ is set such that the reflectance is lower at upper and lower portions of the mirror $12_1$ than that at a vertically middle portion thereof, as shown in FIG. 4.

The operation of the first embodiment will be described below. Because the reflectance is lower at upper and lower portions of the mirror $12_1$ than that at a vertically middle portion thereof, the amount of light of upper and lower portions of a beam projected forwardly from the mirror $12_1$ is decreased, as compared with the vertically central portion of the beam. As a result the shape of the outgoing beam at a forward reach end consequentially becomes a tear-droplet form in a vertical plane extending in an advancing direction, as shown in FIGS. 3 and 5.

Figure 5:
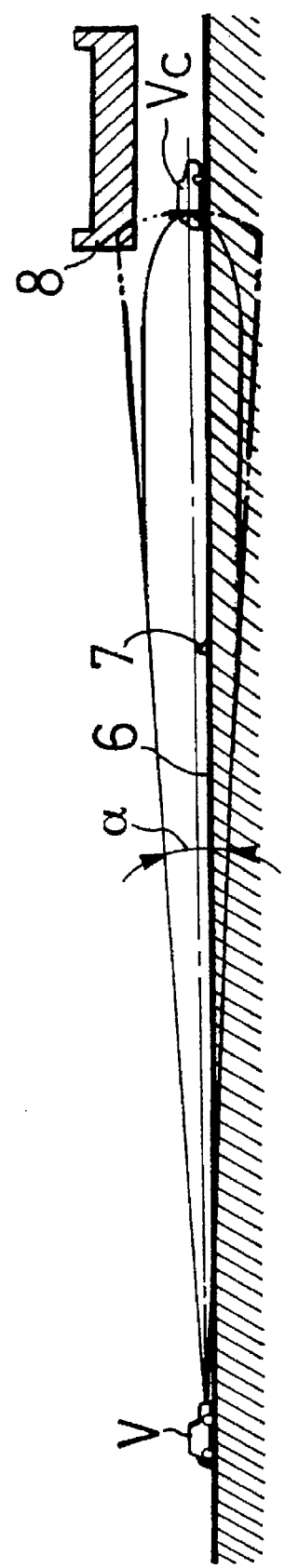
FIG. 5 is a vertical sectional view of outgoing beam projected from the vehicle.

For this reason, even if a foreign matter 7 exists on a road surface between the subject vehicle and a preceding vehicle $V_c$ to be detected, as shown in FIG. 5, the intensity of beam reflected from the foreign matter 7 is extremely weak, because the amount of light of the lower portion of the beam is decreased. Therefore, the detection of the foreign matter 7 is avoided to the utmost. When a bridge 8, a traffic sign or the like exists above the preceding vehicle $V_c$, the intensity of the beam reflected from the bridge 8, the traffic sign or the like is also extremely weak, because the amount of light of the upper portion of the beam is decreased. Therefore, the detection of the bridge 8, the traffic sign or the like is avoided to the utmost. Thus, it is possible to avoid an unnecessary detection to minimize the possibility of a mis-operation.

In the first embodiment, the reflectance of only one of the upper and lower portions of the mirror $12_1$ may be lowered. When the reflectance of the upper portion is lowered, an unnecessary detection on the upper side can be avoided. When the reflectance of the lower portion is lowered, an unnecessary detection on the lower side, i.e., on the side of the road surface 6 can be avoided.

Figure 6:
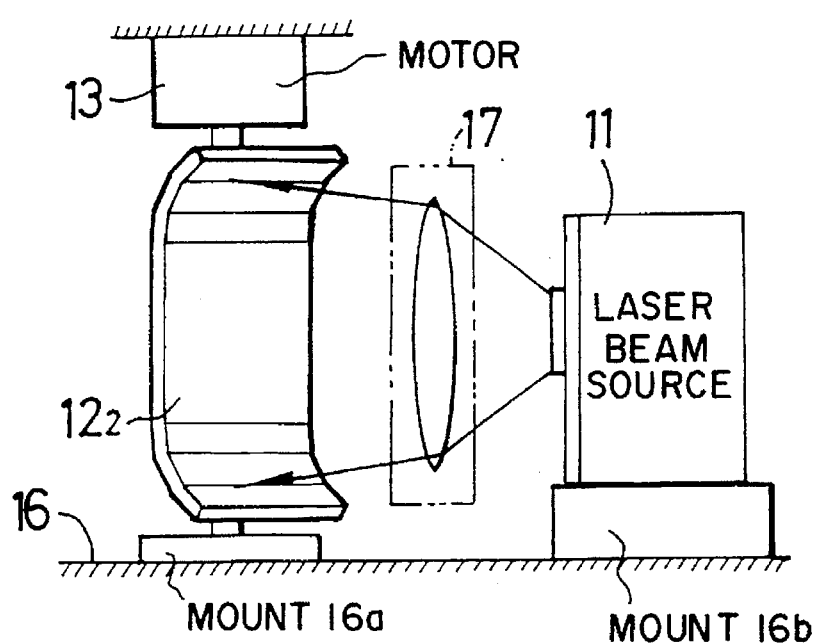
FIG. 6 is a front view similar to FIG. 2, but illustrating a laser radar system according to a second embodiment of the present invention.

FIG. 6 illustrates a second embodiment of the present invention. In the second embodiment, a mirror $12_2$ for reflecting laser beam irradiated from the laser beam source 11 through the lens arrangement 17 is formed into a multi-reflector type in which its upper and lower portions are inclined toward the laser beam source 11.

If such mirror $12_2$ is used, the beam projected forwardly of the vehicle V by reflection from the mirror $12_2$ is inhibited from spreading vertically, so that the amount of light of upper and lower portions of the beam can be decreased, as compared with a system using a conventional plane mirror having an equivalent reflectance over its entire surface, thereby avoiding an unnecessary detection to minimize the possibility of a mis-operation, as in the first embodiment.

In the second embodiment, only one of the upper and lower portions of the mirror $12_2$ may be inclined toward the laser beam source 11.

Although the embodiments of the present invention have been described in detail, it will be understood that the present invention is not limited to the above-described embodiments, and various modifications in design may be made without departing from the spirit and scope of the invention defined in claims.

What is claimed is:

1. A scanning type laser radar system for a vehicle, comprising:

a laser beam source;

a mirror for forming a beam directed forwardly by reflection of a laser beam from said laser beam source, said mirror having upper, lower, and central reflecting portions;

driving means for driving the mirror for turning movement about an axis vertical to a road surface to laterally scan the beam from said mirror; and a light receiver for receiving beam reflected from an object, wherein a reflectance of at least one of the upper and lower reflecting portions of said mirror is set at a value lower than a reflectance of the central reflecting portion of said mirror.

2. A scanning type laser radar system for a vehicle, comprising:

a laser beam source;

a mirror for forming a beam directed forwardly by reflection of a laser beam from said laser beam source, said mirror having upper, lower, and central reflecting surfaces;

driving means for driving the mirror for turning movement about an axis vertical to a road surface to laterally scan the beam from said mirror; and a light receiver for receiving beam reflected from an object, wherein at least one of the upper and lower surface of said mirror is inclined toward said laser beam source at an inclination angle which is different from an inclination angle of said central surface.

3. A scanning type laser radar system according to claim 1, wherein said upper, lower and central reflecting portions of the mirror are formed of a single flat surface.

4. A scanning type laser radar system according to claim 2, wherein said mirror is formed as a multi-reflector type.

* * * * *